(Model.)
W. E. PORTER.
ALARM CLOCK.
No. 496,667. Patented May 2, 1893.
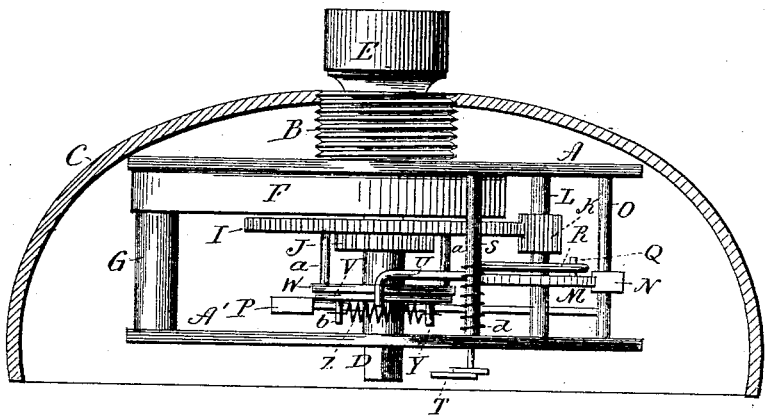
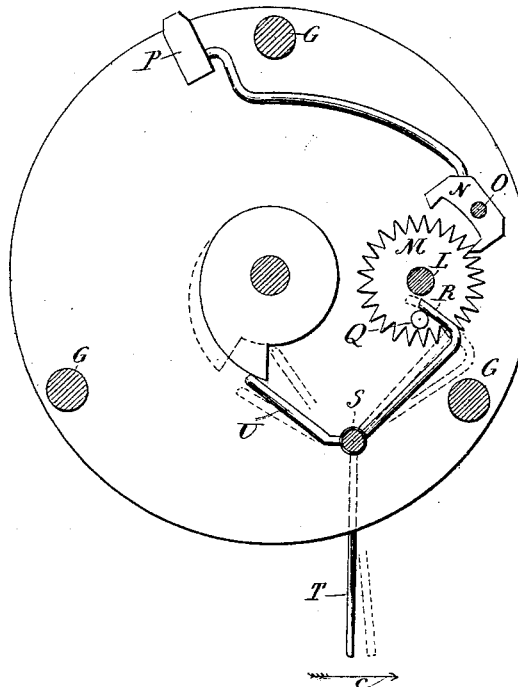
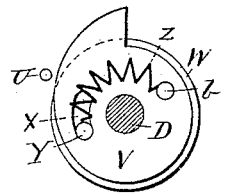
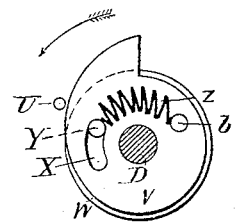
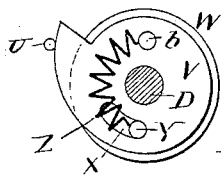
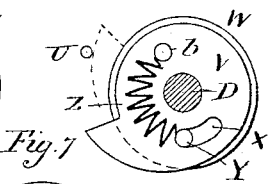
Witnesses
J. H. Shumway
Lillian D. Kelsey
Wilson E. Porter
Inventor
By atty
Earle Seymour

UNITED STATES PATENT OFFICE.

WILSON E. PORTER, OF NEW HAVEN, CONNECTICUT, ASSIGNOR, BY DIRECT AND MESNE ASSIGNMENTS, TO THE NEW HAVEN CLOCK COMPANY, OF SAME PLACE.

ALARM-CLOCK.

SPECIFICATION forming part of Letters Patent No. 496,667, dated May 2, 1893.

Application filed November 2, 1891. Renewed September 6, 1892. Serial No. 445,178. (Model.)

*To all whom it may concern:*

Be it known that I, WILSON E. PORTER, of New Haven, in the county of New Haven and State of Connecticut, have invented a new Improvement in Alarm-Clocks; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of an alarm mechanism constructed in accordance with my invention, the bell being shown in vertical central section; Fig. 2, a view of the mechanism in transverse section on the line $a$—$b$ of Fig. 1, and Fig. 3, a detached reverse plan view of the rotatable stop-cam, the disk with which it is combined, and the stop-arm, (shown in section) the said parts being represented in the positions due to them when the tooth of the cam makes its initial engagement with the said arm, whereby the cam is arrested; Fig. 4, a similar view showing the forward movement of the disk through the length of the slot in the cam which remains at rest, the pin in the disk being moved from the rear to the forward end of the said slot; Fig. 5, a similar view showing the succeeding movement of the disk and cam together, whereby the stop-arm is pushed radially outward by the tooth of the cam, and the detent is thrown into the path of the stop-pin on the escapement-wheel, as shown by Fig. 2; Fig. 6 a similar view showing the further outward movement of the stop-arm (by the time-mechanism) and the clearance of the cam from under the same by the action of its spring; Fig. 7, a similar view showing the said arm thrown inward by its spring, whereby the detent is cleared from the path of the stop-pin and the alarm mechanism permitted to run.

My invention relates to an improvement in alarm-clocks, the object being to produce a simple, durable and reliable alarm-mechanism, adapted to run without re-winding as long as the time mechanism with which it is associated runs without being wound.

With these ends in view, my invention consists in an alarm-mechanism having a train, means for controlling the escapement thereof, a bell-hammer, a detent for holding the train in check, a tripping-arm for operating the detent, a rotatable stop-mechanism driven by the train, and having spring-actuated movement independent thereof, and a stop-arm rigidly connected with the tripping-arm and detent, and co-operating with the said stop-mechanism to stop the train after the said stop-mechanism has made approximately one revolution.

My invention further consists in certain details of construction and combinations of parts as will be hereinafter described and pointed out in the claims.

As herein shown, the alarm-mechanism is mounted in two ordinary plates A and A', the plate A, being furnished with a threaded sleeve B, receiving the bell C. The main shaft D, forming the winding spindle of the device, passes through the said sleeve B, and is furnished at its outer extremity with a knurled button E, by means of which the spring F, is wound, one end of the said spring being attached to one of three pillars G, connecting the two movement plates A A' aforesaid, while its outer end is attached to the said shaft D.

The train of the mechanism comprises the main-wheel I, loosely mounted on the said shaft, and connected therewith by the usual winding ratchet J and its pawl (which is not shown), a pinion K, meshing into the main-wheel I and mounted upon a shaft L, and an escapement-wheel M, mounted on the shaft L, and engaged by a pallet N, hung on a shaft O, and carrying the bell-hammer P. The said escapement-wheel M, is provided with a stop-pin Q, which is engaged by a detent R, mounted in a shaft S, which also carries the tripping-arm T, and the stop-arm U, the said tripping-arm T, extending beyond the plates A and A', and being operated to trip the alarm-mechanism by the time-mechanism in the ordinary manner. The said stop-arm U, co-operates with my improved rotatable stop-mechanism. This latter, as herein shown, consists of a cam V, loosely mounted on the shaft D, and bearing against a disk W of about the same diameter, the said disk being rigidly supported by two pins a a, projecting from the lower face of the wheel I. A segmental slot X, formed in the cam V, receives a pin Y, mounted in the disk W, and limiting the rotary movement which the cam has independent of the shaft D. A small spiral-spring Z, attached at one end by a stud b, to the cam, is connected at its opposite end with the pin Y, and operates to move the cam within the limits of the segmental slot X, in the direction in which the cam is turned by the shaft or spindle D, when the same is being rotated by the spring F. Normally, or when the said alarm mechanism is at rest, the detent R, is engaged with the stop-pin Q, as shown by Fig. 2 of the drawings, the stop-arm being then held in its intermediate position by the tooth of the stop-cam, as shown by the said figure, and also Fig. 5. Now, when under the action of the time-mechanism, the tripping-arm T is moved in the direction of the arrow c, (Fig. 2) the stop-arm will be momentarily moved away from the tooth of the cam into its extreme outward position as shown, (by broken lines) in Fig. 2 of the drawings and in Fig. 6 thereof, and the stop-cam will be quickly cleared from under the said arm by the action of its spring, as shown by the figure last mentioned, whereby the said arm will be allowed to move under the influence of its spring, (Fig. 1) into its extreme inward position, as shown by Fig. 7, and also (by broken lines) by Fig. 2, in which latter figure the consequent disengagement of the detent R from the stop-pin Q, is also shown. The detent being thus cleared from the stop-pin, the train will be free to run. The alarm will now be sounded by the pulsations of the bell-hammer P upon the bell C, until the stop-cam has made something less than a revolution, say three-quarters of a full turn. At this time the base of its tooth engages with the stop-cam as shown by Fig. 3 of the drawings, and it is arrested, or at least theoretically, for possibly the restraining power of the arm may not, at the initial engagement of the cam-tooth with it, be superior to the force of the cam-spring, which will tend to cause the cam to continue to rotate for a short distance. But practically the cam will stand still until the rotation of the disk has moved the pin Y, thereof through the length of its slot, and engaged the said pin with the forward end of the said slot, as shown by Fig. 4 of the drawings. The cam will now rotate with the disk, whereby the stop-arm will be pushed radially outward until the movement so imparted to it causes the detent R to be thrown into the path of the stop-pin Q, and the alarm-train stopped, whereby the rotation of the cam will be arrested with the stop-arm engaged with its tooth substantially as shown by Figs. 2 and 5 of the drawings, which show the normal positions of the parts.

Then when the time-mechanism again acting through the tripping-arm T, momentarily moves the stop-arm to the limit of its outward adjustment, as shown by Fig. 6 of the drawings, and by broken lines in Fig. 5 thereof, the cam will be released and cleared from under the said arm, as shown by the said Fig. 6 of the drawings, which shows the cam in its cleared position by full lines, and in its normal position by broken lines. The cam being thus got out of the way and the tripping-arm T being released, the stop-arm is thrown inward, as shown by Fig. 7 of the drawings, and also in broken lines by Fig. 2 thereof, which shows the detent cleared from the stop-pin. The alarm-train is now free to be driven and the operation above set forth will be repeated, and so on. It will thus be seen that the alarm mechanism is automatically stopped by the rotatable stop-mechanism, after the same has made something less than one revolution.

I would have it understood that I do not limit myself to the particular form of rotatable stop mechanism shown and described, but hold myself at liberty to make such changes and alterations as fairly fall within the spirit and scope of my invention.

Having fully described my invention, what I claim as new, and desire to secure by Letters Patent, is—

1. An alarm-mechanism having a train, means for controlling the escapement thereof, a bell-hammer, a detent for holding the train in check, a tripping-arm for operating the detent, a rotatable stop-mechanism driven by the train and having spring-actuated movement independent thereof, and a stop-arm rigidly connected with the tripping-arm and detent, and co-operating with the said stop-mechanism to stop the train after said stop-mechanism has made one revolution, substantially as described.

2. An alarm-mechanism having a train, means for controlling the escapement thereof, a bell-hammer, a detent for holding the train in check, a tripping-arm for operating the detent, a rotatable stop-cam loosely mounted on a shaft of the train, and having limited rotatable movement independent of said shaft, and provided with a spring which operates it independently of the train, and a stop-arm rigidly connected with the tripping-arm and detent and engaging with the said cam which is cleared from it for starting the train by said spring, substantially as described.

In testimony whereof I have signed this specification in the presence of two subscribing witnesses.

WILSON E. PORTER.

Witnesses:
E. B. WARREN,
S. A. GALPIN.